United States Patent
Khoshnevisan et al.

(10) Patent No.: US 12,341,717 B2
(45) Date of Patent: Jun. 24, 2025

(54) PSEUDO-RANDOM SOUNDING REFERENCE SIGNAL TRANSMISSION

(71) Applicant: QUALCOMM Incorporated, San Diego, CA (US)

(72) Inventors: Mostafa Khoshnevisan, San Diego, CA (US); Yitao Chen, San Diego, CA (US); Mahmoud Taherzadeh Boroujeni, San Diego, CA (US); Wooseok Nam, San Diego, CA (US); Sony Akkarakaran, Poway, CA (US); Yan Zhou, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 17/811,427

(22) Filed: Jul. 8, 2022

(65) Prior Publication Data
US 2024/0014960 A1 Jan. 11, 2024

(51) Int. Cl.
*H04W 8/26* (2009.01)
*H04L 5/00* (2006.01)
*H04L 27/26* (2006.01)

(52) U.S. Cl.
CPC ........ *H04L 5/0048* (2013.01); *H04L 27/2613* (2013.01)

(58) Field of Classification Search
CPC ............ H04B 7/0695; H04W 74/0833; H04W 16/14; H04W 76/20; H04W 72/21; H04W 72/1268; H04L 27/2613; H04L 5/0048; H04L 5/0051; H04J 13/0062
See application file for complete search history.

(56) References Cited

U.S. PATENT DOCUMENTS

2022/0116089 A1* 4/2022 Khoryaev ............. H04W 64/00
2022/0191935 A1* 6/2022 Xiong ............... H04W 74/0836

* cited by examiner

*Primary Examiner* — Phuoc H Doan
(74) *Attorney, Agent, or Firm* — QUALCOMM Incorporated

(57) ABSTRACT

Various aspects of the present disclosure generally relate to wireless communication. In some aspects, a user equipment (UE) may obtain a set of binary sequences, each binary sequence in the set of binary sequences indicating a number of candidate sounding reference signal (SRS) transmission occasions for a time period, wherein a first value for a location in a binary sequence indicates that an SRS is to be transmitted for an SRS transmission occasion corresponding to the location and a second value for the location in the binary sequence indicates that the SRS is not to be transmitted for the SRS transmission occasion corresponding to the location. The UE may select a binary sequence from the set of binary sequences based at least in part on a pseudo-random sequence. The UE may transmit the SRS in accordance with the selected binary sequence. Numerous other aspects are described.

30 Claims, 14 Drawing Sheets

PSEUDO-RANDOM SOUNDING REFERENCE SIGNAL TRANSMISSION

FIELD OF THE DISCLOSURE

Aspects of the present disclosure generally relate to wireless communication and to techniques and apparatuses for pseudo-random sounding reference signal transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining a set of binary sequences, each binary sequence in the set of binary sequences indicating a number of candidate sounding reference signal (SRS) transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The method may include selecting a binary sequence from the set of binary sequences based at least in part on a pseudo-random sequence. The method may include transmitting the SRS in accordance with the selected binary sequence.

Some aspects described herein relate to a method of wireless communication performed by a network node. The method may include identifying information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The method may include transmitting the information associated with the set of binary sequences to one or more UEs.

Some aspects described herein relate to an apparatus for wireless communication performed by a UE. The apparatus may include a memory and one or more processors, coupled to the memory. The one or more processors may be configured to obtain a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The one or more processors may be configured to select a binary sequence from the set of binary sequences based at least in part on a pseudo-random sequence. The one or more processors may be configured to transmit the SRS in accordance with the selected binary sequence.

Some aspects described herein relate to an apparatus for wireless communication performed by a network node. The apparatus may include a memory and one or more processors, coupled to the memory. The one or more processors may be configured to identify information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion correspond- ing to the location in the binary sequence. The one or more processors may be configured to transmit the information associated with the set of binary sequences to one or more UEs.

Some aspects described herein relate to a non-transitory computer-readable medium that stores a set of instructions for wireless communication by a UE. The set of instructions, when executed by one or more processors of the UE, may cause the UE to obtain a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The set of instructions, when executed by one or more processors of the UE, may cause the UE to select a binary sequence from the set of binary sequences based at least in part on a pseudo-random sequence. The set of instructions, when executed by one or more processors of the UE, may cause the UE to transmit the SRS in accordance with the selected binary sequence.

Some aspects described herein relate to a non-transitory computer-readable medium that stores a set of instructions for wireless communication by a network node. The set of instructions, when executed by one or more processors of the network node, may cause the network node to identify information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The set of instructions, when executed by one or more processors of the network node, may cause the network node to transmit the information associated with the set of binary sequences to one or more UEs.

Some aspects described herein relate to an apparatus for wireless communication. The apparatus may include means for obtaining a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The apparatus may include means for selecting a binary sequence from the set of binary sequences based at least in part on a pseudo-random sequence. The apparatus may include means for transmitting the SRS in accordance with the selected binary sequence.

Some aspects described herein relate to an apparatus for wireless communication. The apparatus may include means for identifying information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The apparatus may include means for transmitting the information associated with the set of binary sequences to one or more UEs.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
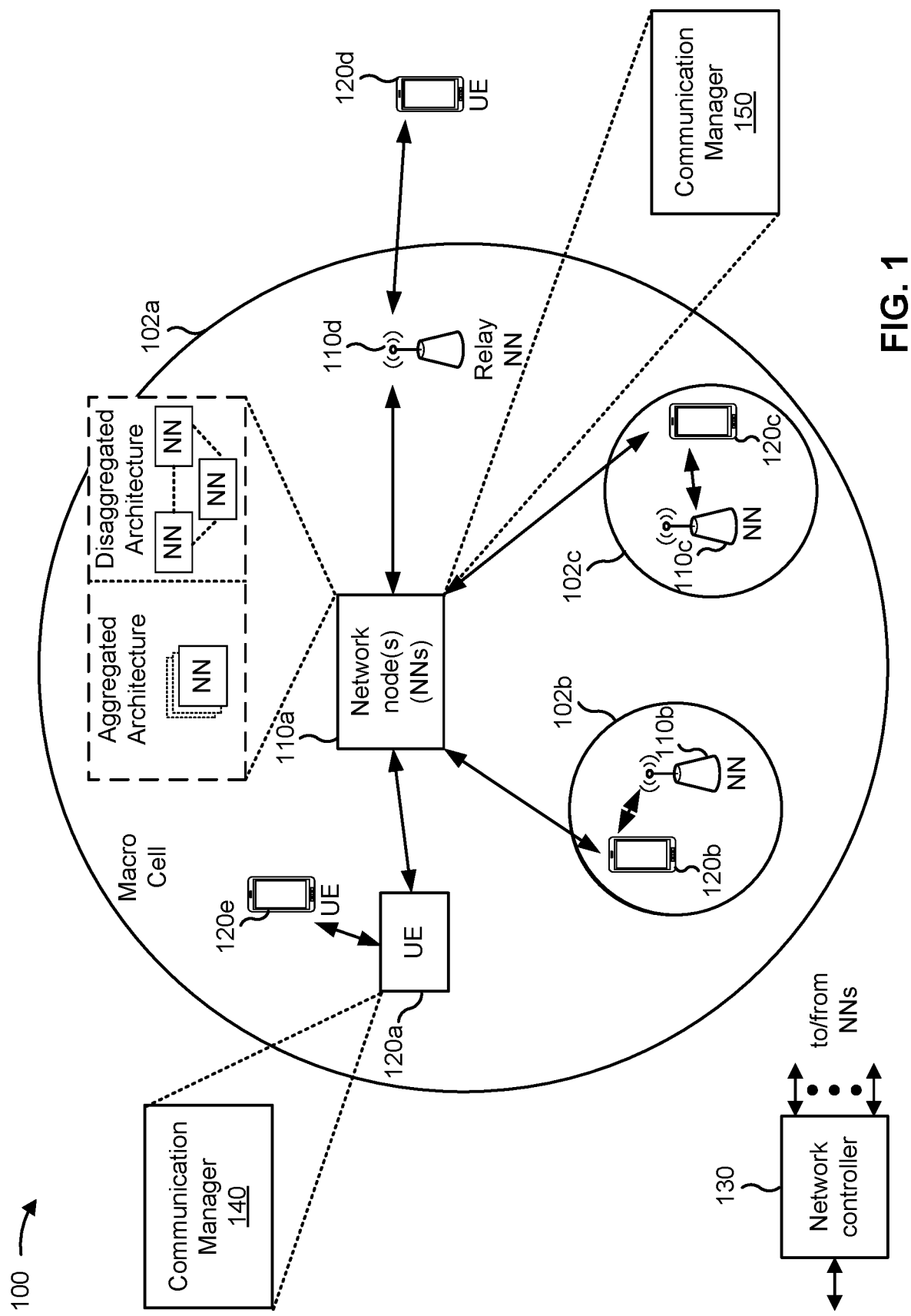
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain a set of binary sequences, each binary sequence in the set of binary sequences indicating a number of candidate sounding reference signal (SRS) transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence; select a binary sequence from the set of binary sequences based at least in part on a pseudo-random sequence; and transmit the SRS in accordance with the selected binary sequence. Additionally, or alternatively, the communication manager 140 may perform one or more other operations described herein.

In some aspects, the network node 110 may include a communication manager 150. As described in more detail elsewhere herein, the communication manager 150 may identify information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence; and transmit the information associated with the set of binary sequences to one or more UEs. Additionally, or alternatively, the communication manager 150 may perform one or more other operations described herein.

As indicated above, FIG. 1 is provided as an example. Other examples may differ from what is described with regard to FIG. 1.

Figure 2:
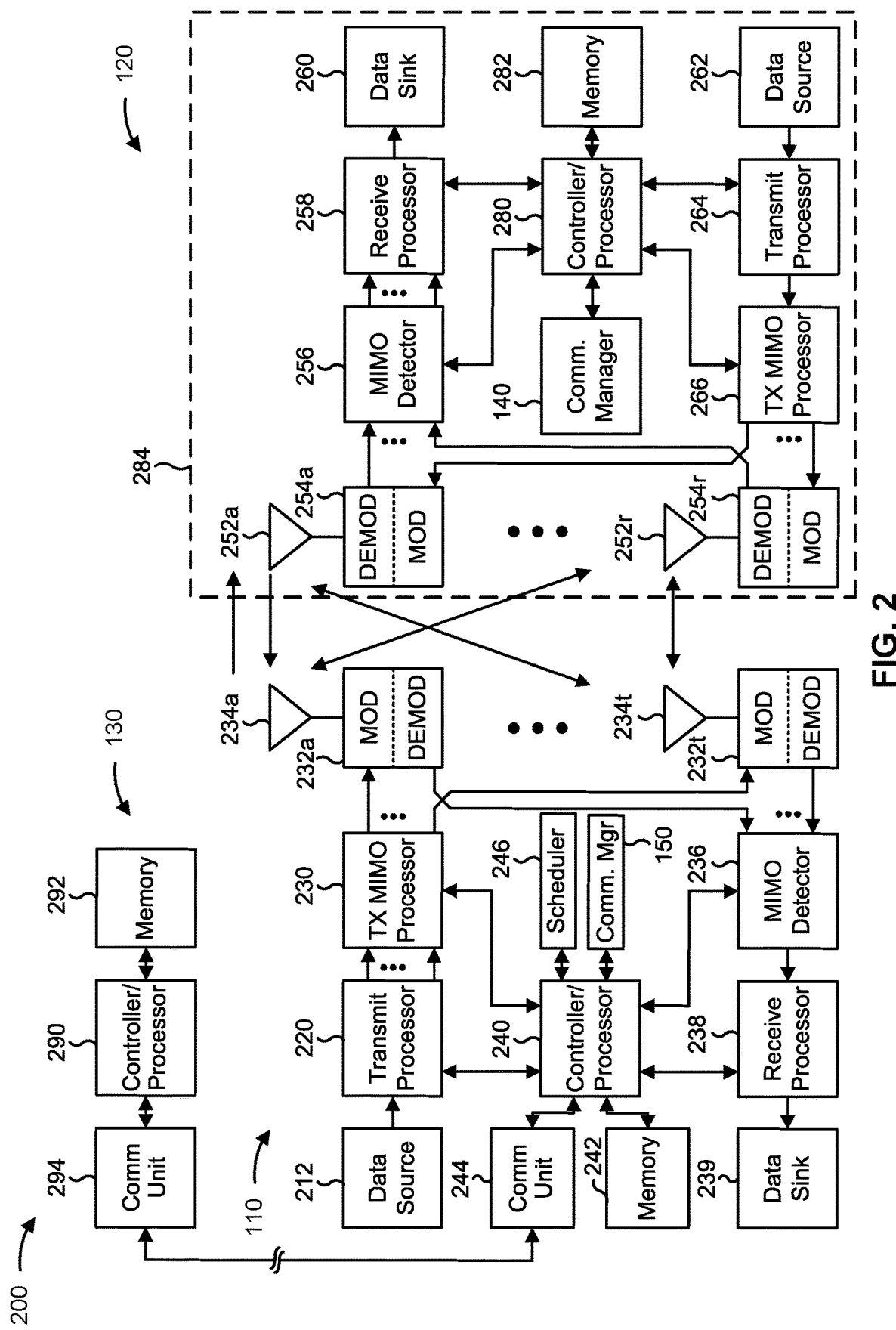
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the network node 110, the controller/processor 280 of the UE 120, and/or any other component(s) of FIG. 2 may perform one or more techniques associated with pseudo-random SRS transmission, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for obtaining a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence; means for selecting a binary sequence from the set of binary sequences based at least in part on a pseudo-random sequence; and/or means for transmitting the SRS in accordance with the selected binary sequence. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for identifying information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence; and/or means for transmitting the information associated with the set of binary sequences to one or more UEs. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
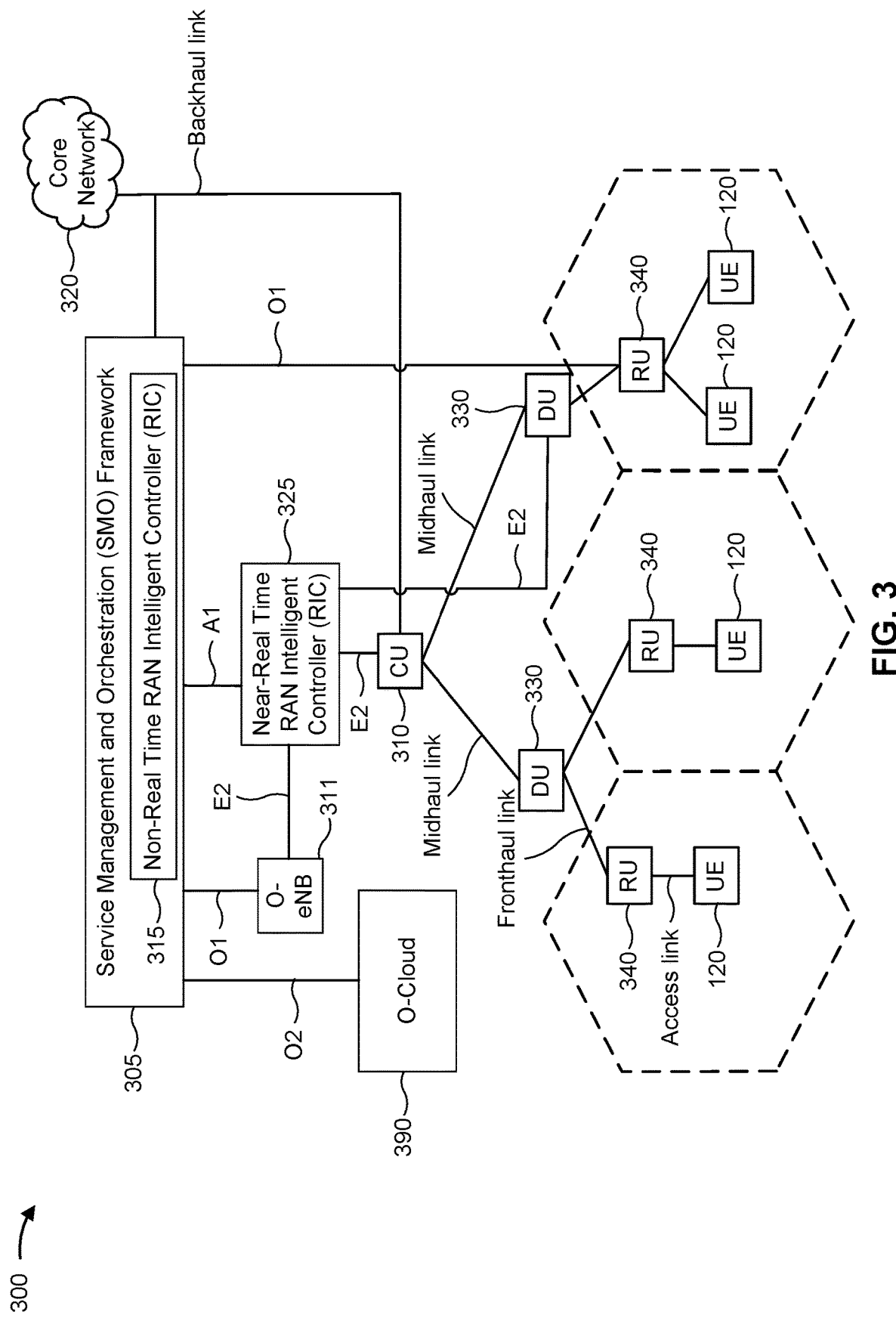
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
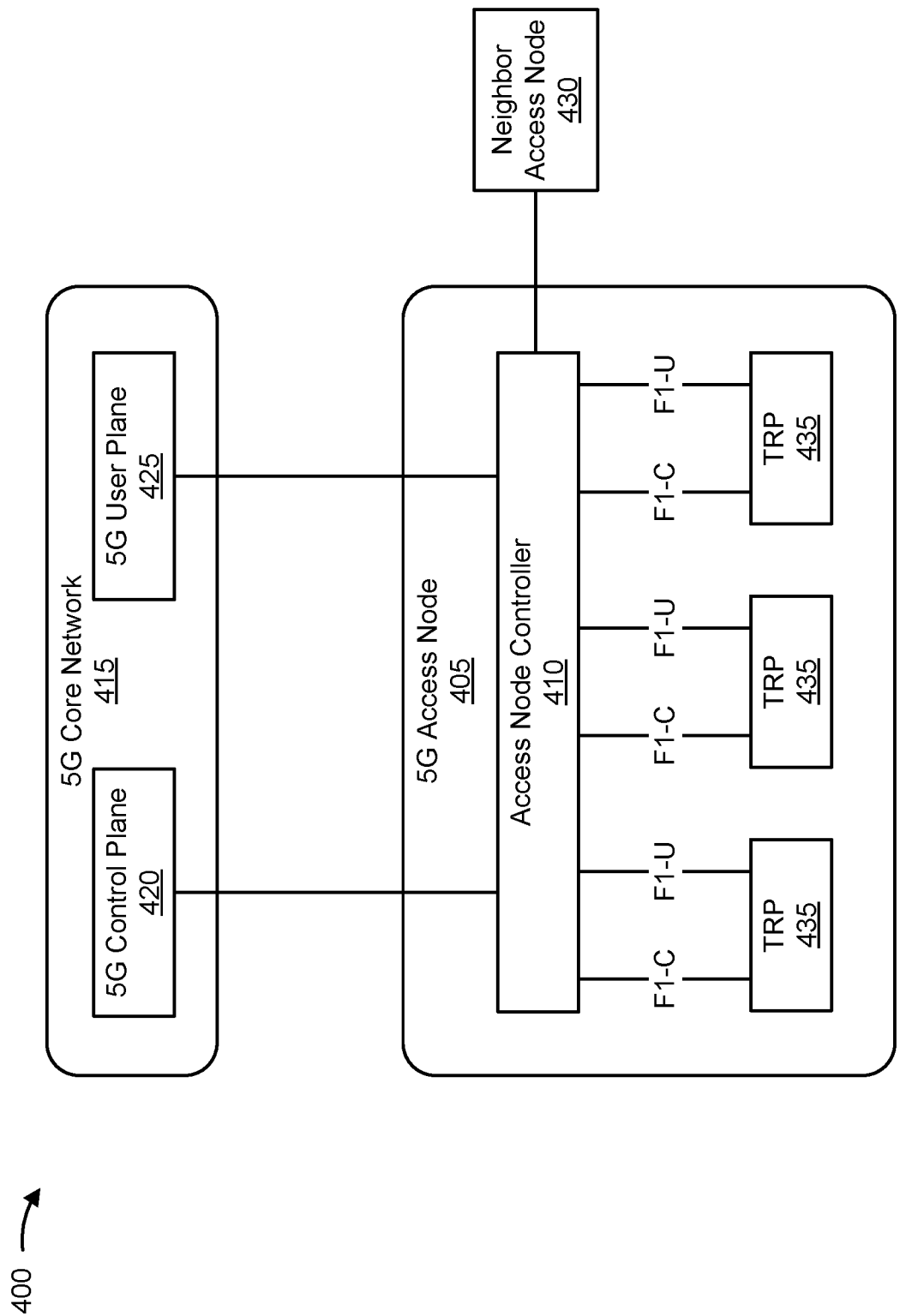
FIG. 4 illustrates an example logical architecture of a distributed radio access network (RAN), in accordance with the present disclosure.

FIG. 4 illustrates an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a DU of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400. For example, a PDCP layer, an RLC layer, and/or a medium access control (MAC) layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using coherent joint transmission (CJT) with one or more other TRPs 435) serve traffic to a UE 120. As described in more detail below, multi-TRP communication (e.g., communications by multiple TRPs or between the multiple TRPs) with a plurality of UEs may result in interference and/or network congestion.

As indicated above, FIG. 4 is provided as an example. Other examples may differ from what was described with regard to FIG. 4.

Figure 5:
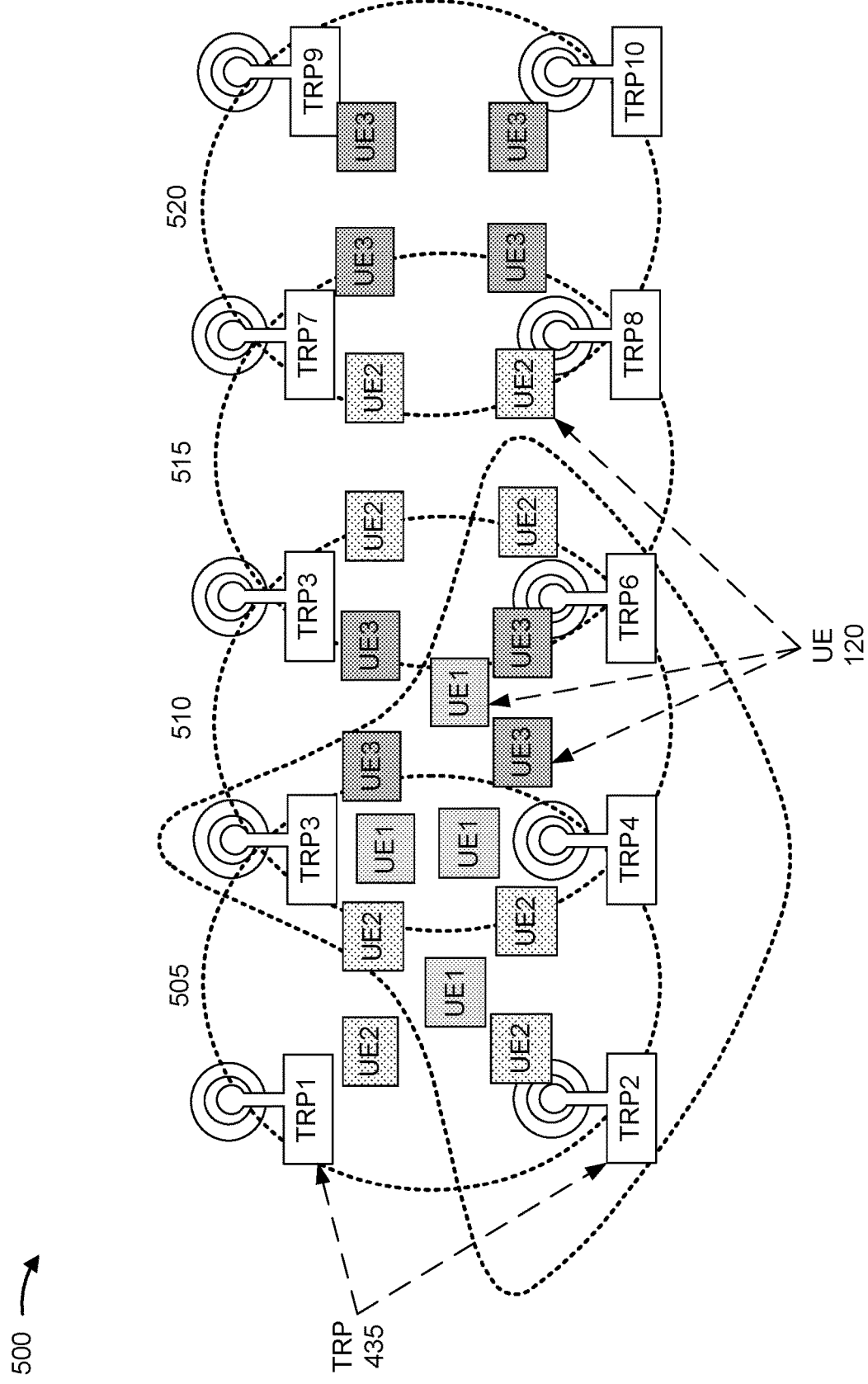
FIG. 5 is a diagram illustrating an example of transmission reception point communication, in accordance with the present disclosure.

FIG. 5 is a diagram illustrating an example 500 of multi-TRP communication, in accordance with the present disclosure. Multiple TRPs may communicate with a plurality of UEs. For example, ten TRPs (labeled TRP1 through TRP10) may communicate with multiple UEs labeled as UE1, UE2, and UE3. The TRPs may be similar or identical to the TRP 435, and the UEs may be similar or identical to the UE 120. Each TRP may be associated with one or more clusters, such as the clusters 505, 510, 515, and 520. The UEs may be located at different points in a cluster, may move within the cluster, and/or may move between clusters. As described herein, the TRPs may communicate using CJT to serve traffic to the UEs.

In some cases, multiple TRPs may receive SRS transmissions from a UE. As the number of UEs transmitting the SRS to a given TRP increases, the UEs may need to send the SRS on the same OFDM symbols. For example, a single OFDM symbol (or more than one OFDM symbol) may include SRSs from multiple UEs. In some cases, interference randomization may be necessary to reduce inter-cluster interference. In some examples, the interference randomization may include group hopping or sequence hopping (in the SRS base sequence domain). Additionally, or alternatively, the interference randomization may include cyclic shift hopping or comb sequence hopping. However, as the UEs transmit SRS with higher power (e.g., to enable the multiple TRPs to estimate the channel for CJT), these interference randomization and mitigation techniques may not be sufficient to reduce the interference in the network. Additional details regarding these features are described in connection with FIGS. 6A-6B.

As indicated above, FIG. 5 is provided as an example. Other examples may differ from what was described with regard to FIG. 5.

Figure 6A:
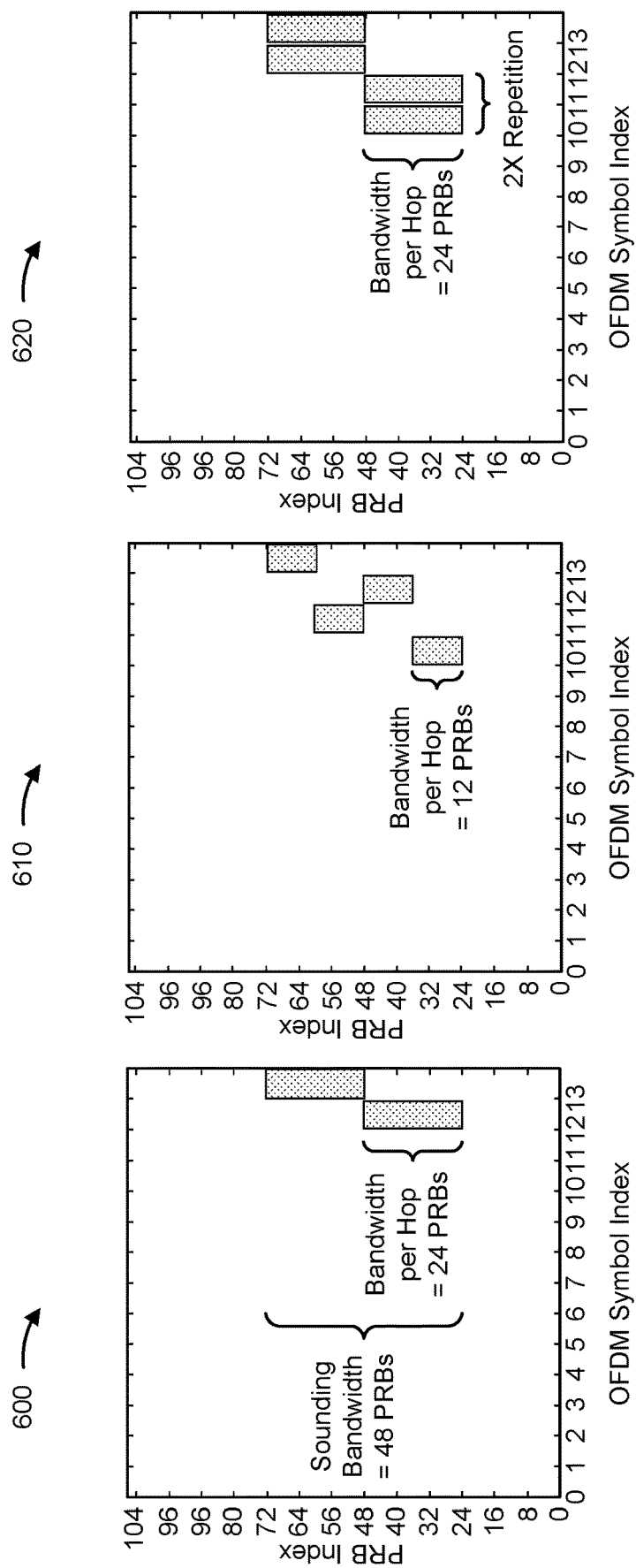
FIGS. 6A-6B are diagrams illustrating examples of frequency hopping and repetition, in accordance with the present disclosure.
Figure 6B:
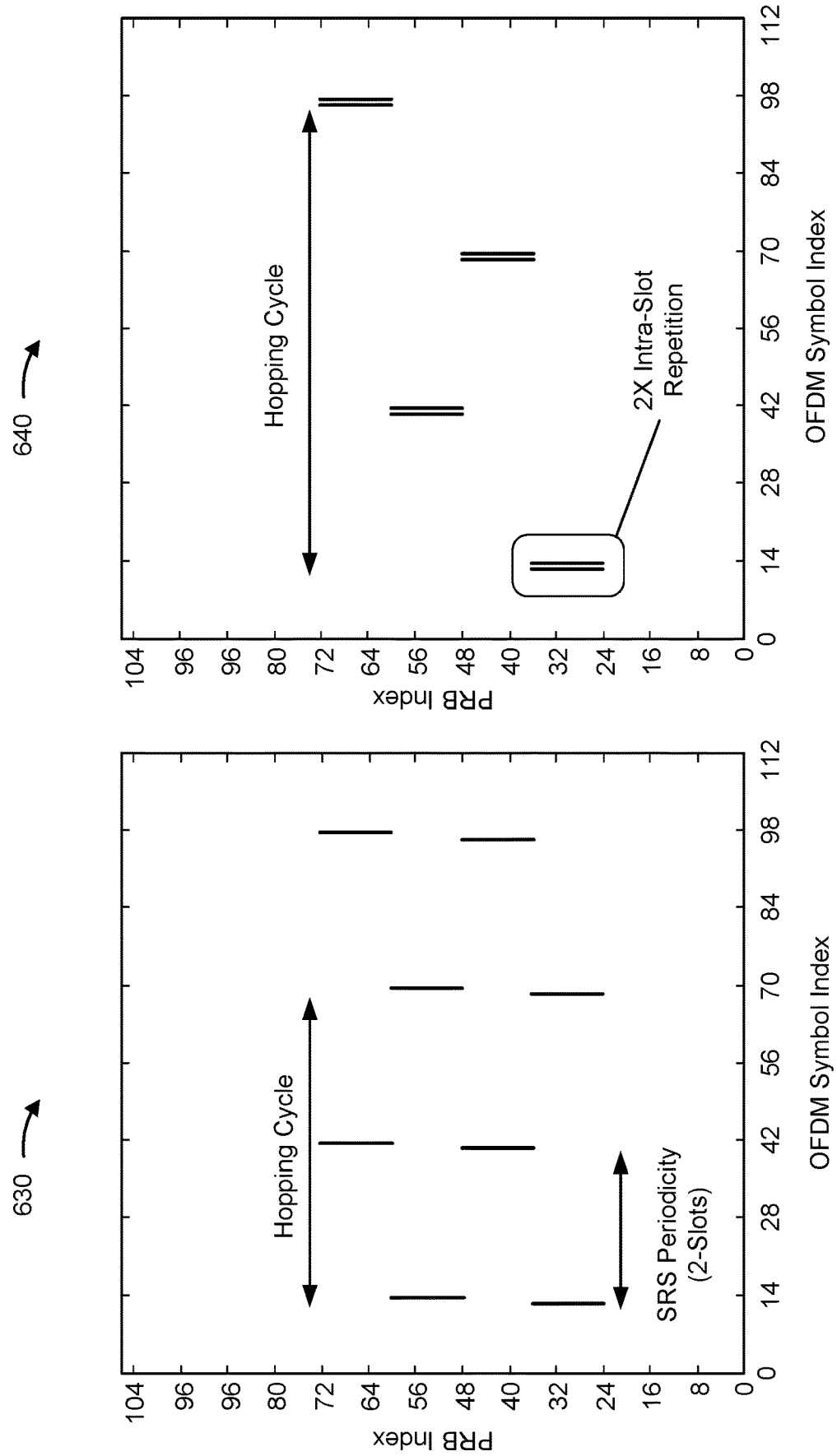

FIGS. 6A-6B are diagrams illustrating examples 600, 610, 620, 630, and 640 of frequency hopping and repetition, in accordance with the present disclosure. SRS resources may be configured with a number of OFDM symbols (N) and a number of repetitions (R). In some cases, if R<N, there may be N/R frequency hops within the SRS resource.

In the examples 600, 610, and 620, the sounding bandwidth may be equal to 48 physical resource blocks (PRBs). In the example 600, N=2 and R=1. In this case, the bandwidth per hop may be 24 PRBs. In the example 610, N=4 and R=1. In this case, the bandwidth per hop may be 12 PRBs. In the example 620, N=4 and R=2. In this case, the bandwidth per hop may be 24 PRBs, with two repetitions for each hop. An example relationship between the number of symbols (N) per SRS resource and the number of repetitions (R) is shown in Table 1.

TABLE 1

| N per SRS resource | R (repetition factor) |
| --- | --- |
| 1 | 1 |
| 2 | 1, 2 |
| 4 | 1, 2, 4 |
| 8 | 1, 2, 4, 8 |
| 10 | 1, 2, 5, 10 |
| 12 | 1, 2, 3, 6, 12 |
| 14 | 1, 2, 7, 14 |

In some cases, for periodic and semi-persistent SRS, the frequency hopping may be intra-slot, inter-slot, or both intra-slot and inter-slot. In the case of inter-slot frequency hopping, a hopping cycle may complete across multiple SRS periodicities. The example 630 shows four frequency hops using intra-slot and inter-slot hopping across two periodicities, where N=2 and R=1. In this case, the hopping cycle may be X OFDM symbols. The example 640 shows four frequency hops using inter-slot hopping across four periodicities, where when N=2 and R=2. In this case, the hopping cycle may be 2X OFDM symbols.

In some cases, SRS muting may be performed in a pseudo-random manner to reduce interference. For example, an SRS resource may be configured with a pseudo-random sequence for muting an SRS associated with the SRS resource, and the UE 120 may transmit the SRS based at least in part on the pseudo-random sequence. The pseudo-random sequence may be used to determine whether, at a given time, the UE 120 should transmit the SRS (e.g., the SRS should not be muted) or should not transmit the SRS (e.g., the SRS should be muted). In some cases, the UE 120 may determine whether or not to transmit the SRS based at least in part on performing an operation between a pseudo-random number associated with the pseudo-random sequence and an integer, and/or by comparing a result of the operation between the pseudo-random number and the integer to a threshold. The pseudo-random sequence may be a function of time and, in some cases, may be a function of one or more additional parameters to increase randomness, such as one or more of a comb offset index, a cyclic shift index, or an SRS sequence index (e.g., a group index or sequence index within the group) associated with the SRS resource.

In one example, the UE 120 may be configured to perform an SRS transmission at half of the SRS transmission occasions (on average) and to not perform the SRS transmission (e.g., mute the SRS transmission) at the other half of the SRS transmission occasions. In this case, the UE 120 may perform an operation that uses a modulo of two. The UE 120 may transmit the SRS based at least in part on a result of the operation being equal to one. Alternatively, the UE 120 may not transmit the SRS based at least in part on the result of the operation being equal to zero. Pseudo-randomly muting the SRS transmissions may decrease the interference levels at the receiver since, at a given time, SRSs for some UEs may be muted, thus decreasing SRS density in a given resource, and/or because different combinations of UEs may simultaneously transmit SRSs in different transmission instances (e.g., in different slots and/or symbols), thereby avoiding consistent SRS interference at the receiver. However, muting the SRS transmissions as described above may not be sufficient to ensure that there are not a large number of consecutive muting occasions or a large number of consecutive transmission occasions. For example, the transmission of the SRS resources using the pseudo-random sequence described above may result in the following transmission pattern, where "1" represents a transmission and "0" represents a non-transmission (e.g., a muting): 00101000001011111. As shown, the pseudo-random sequence described above may result in five consecutive muting occasions and five consecutive transmission occasions. This may negatively impact the performance of the network since the channel may not be available to a network node (e.g., the TRP 435) during the consecutive muting occasions. Additionally, interference may persist for a duration that spans the number of consecutive transmission occasions.

Techniques and apparatuses are described herein for pseudo-random SRS transmission. In some aspects, the UE may obtain a set of binary sequences, each binary sequence in the set of binary sequences indicating a number of candidate SRS transmission occasions for a time period. A first value for a location in a binary sequence in the set of binary sequences may indicate that an SRS is to be transmitted for an SRS transmission occasion corresponding to the location in the binary sequence, and a second value for the location in the binary sequence may indicate that the SRS is not to be transmitted for the SRS transmission occasion corresponding to the location in the binary sequence. The UE may select a binary sequence from the set of binary sequences based at least in part on a pseudo-random sequence, and may transmit the SRS in accordance with the selected binary sequence.

As described above, randomly muting the SRS transmissions may not be sufficient to ensure that there is not a large number of consecutive muting occasions or a large number of consecutive transmission occasions. This may negatively impact the performance of the network since the channel may not be available to the network node during consecutive muting occasions. Additionally, interference may persist for a duration that spans the number of consecutive transmission occasions. Using the techniques and apparatuses described herein, the UE may select a binary sequence from a set of binary sequences based at least in part on a pseudo-random sequence. The binary sequences may be configured such that the UE does not experience a large number of consecutive muting occasions or a large number of consecutive transmission occasions. This may improve the performance of the network due to greater availability of the channel and reduced interference.

As indicated above, FIGS. 6A-6B are provided as examples. Other examples may differ from what was described with regard to FIGS. 6A-6B.

Figure 7:
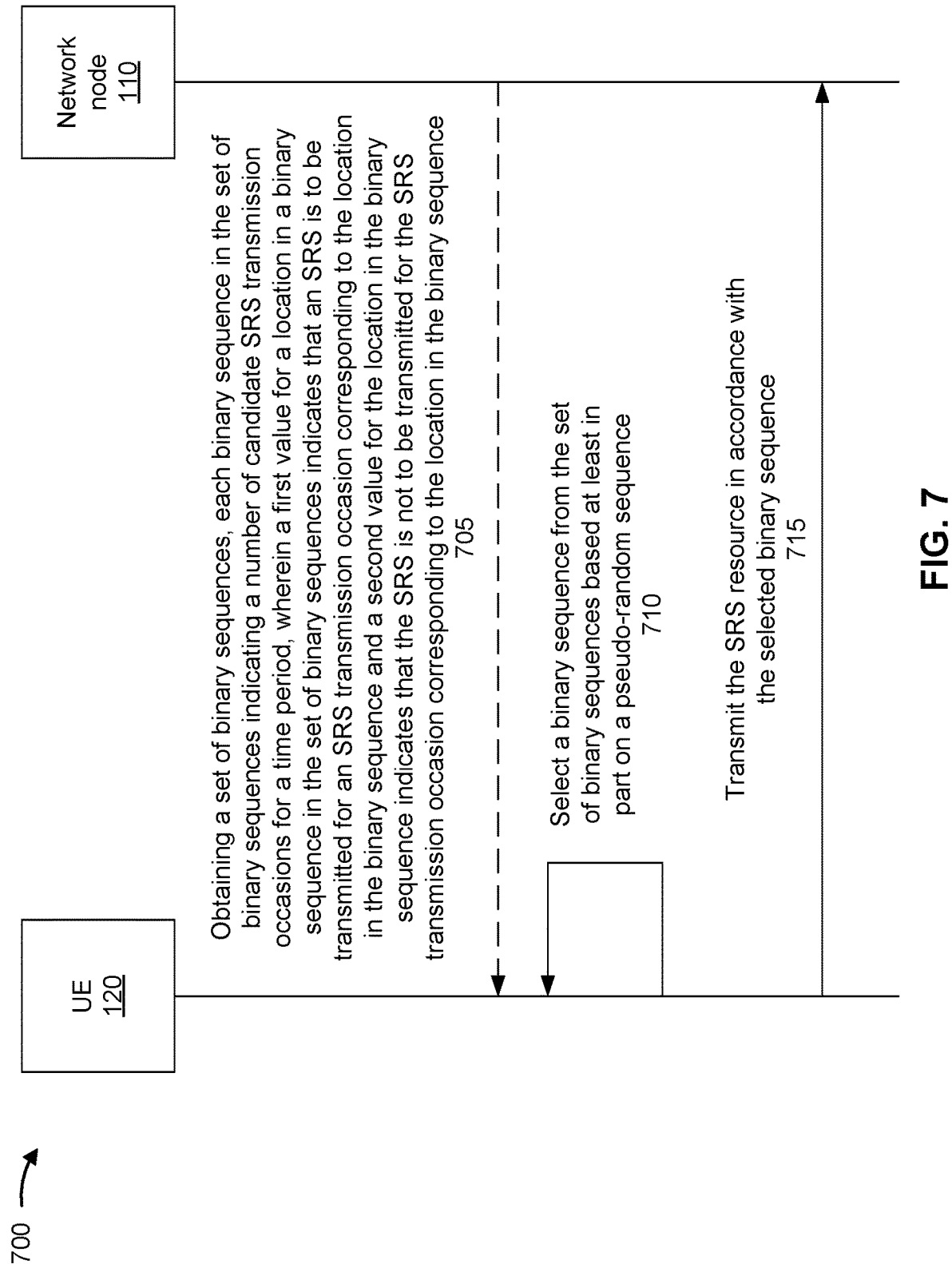
FIG. 7 is a diagram illustrating an example of pseudo-random sounding reference signal (SRS) transmission, in accordance with the present disclosure.

FIG. 7 is a diagram illustrating an example 700 of pseudo-random SRS transmission, in accordance with the present disclosure. The UE 120 may communicate with the network node 110. In some aspects, the network node 110 may be a TRP, such as the TRP 435.

As shown by reference number 705, the UE 120 may obtain a set of binary sequences. Each binary sequence in the set of binary sequences may indicate a number of candidate SRS transmission occasions for a time period. A first value (e.g., 1) for a location in a binary sequence in the set of binary sequences may indicate that an SRS is to be transmitted for the SRS transmission occasion corresponding to the location in the binary sequence. In contrast, a second value (e.g., 0) for the location in the binary sequence may indicate that the SRS is not to be transmitted for the SRS transmission occasion corresponding to the location in the binary sequence. In some aspects, the UE 120 may obtain the set of binary sequences based at least in part on a configuration of the UE 120 or based at least in part on receiving the set of binary sequences from the network node 110. In some aspects, the UE 120 may obtain the set of binary sequences based at least in part on generating the set of binary sequences, such as generating the set of binary sequences based at least in part on information received from the network node 110. Additional details regarding these features are described below.

As shown by reference number 710, the UE 120 may select a binary sequence from the set of binary sequences based at least in part on a pseudo-random sequence. In some aspects, for a duration of time (T) that spans L candidate SRS transmission occasions, the UE 120 may select a binary sequence of length L from the set of binary sequences of length L in a pseudo-random manner, where a value of "1" in l'th location of the selected binary sequence indicates that the l'th candidate SRS transmission occasion is actually transmitted and a value of "0" in l'th location of the selected binary sequence indicates that the l'th candidate SRS transmission occasion is not transmitted (e.g., muted), for l=1, 2, . . . , L. An example set of binary sequences for L=4 may be {1000,0100,0010,0001}. For example, in the first binary sequence of the set of binary sequences, the first location may correspond to a transmission occasion and the second, third, and fourth locations may correspond to muting occasions. In the second binary sequence of the set of binary sequences, the second location may correspond to a transmission occasion and the first, third, and fourth locations may correspond to muting occasions. In the third binary sequence of the set of binary sequences, the third location may correspond to a transmission occasion and the first, second, and fourth locations may correspond to muting occasions. In the fourth binary sequence of the set of binary sequences, the fourth location may correspond to a transmission occasion and the first, second, and third locations may correspond to muting occasions.

In some aspects, for pseudo-random selection of a binary sequence for the duration T out of the set of binary sequences, the UE 120 may denote the number of binary sequences in the set of binary sequences as K, where the sequences are indexed by k=0, 1, . . . , K−1. In this case, a binary sequence with index k may be selected as a function of a first slot number or a first symbol number associated with the duration T and based at least in part on a pseudo-random sequence c. In some aspects, the slot number ($n_{s,f}^{\mu}$) may be the slot number (within a frame) corresponding to the first slot in the duration T (e.g., the slot of the first candidate transmission occasion in duration T). In some aspects, the symbol number ($l_0$) may be the symbol number (within a slot) corresponding to the first symbol of the first candidate transmission occasion in the duration T. In some aspects, the formula associated with the binary sequence may be a function of both $n_{s,f}^{\mu}$ and $l_0$:

$$k(n_{s,f}^{\mu}, l_0) = \left( \sum_{m=0}^{M-1} c(M \cdot (n_{s,f}^{\mu} N_{symb}^{slot} + l_0) + m) \cdot 2^m \right) \mod K,$$

where M is the number of elements of the pseudo-random sequence, c is the pseudo-random sequence, and K is the number of binary sequences in the set of binary sequences.

In some aspects, the formula associated with the binary sequence may be a function of $n_{s,f}^{\mu}$ only:

$$k(n_{s,f}^{\mu}) = \left( \sum_{m=0}^{M-1} c(M \cdot n_{s,f}^{\mu} + m) \cdot 2^m \right) \mod K,$$

where M is the number of elements of the pseudo-random sequence, c is the pseudo-random sequence, and K is the number of binary sequences in the set of binary sequences.

As described herein, the selection of the binary sequence may be dependent on the pseudo-random sequence c. Randomization for the selection of binary sequences may be achieved by different initializations of the pseudo-random sequence c across different UEs. In some aspects, the initialization of the pseudo-random sequence c may be reset at the beginning of each radio frame. In a first initialization example, the pseudo-random sequence c may be initialized by $c_{init}=n_{ID}^{SRS}$, where $n_{ID}^{SRS}$ is the SRS sequence identity that is configured for the SRS resource. In this example, the network node 110 may configure the same $n_{ID}^{SRS}$ value for intra-cell or intra-cluster cases but may configure different $n_{ID}^{SRS}$ values for inter-cell or inter-cluster cases. Therefore, inter-cell or inter-cluster interference randomization can be achieved, since UEs in different cells or different clusters may not select the same binary sequence for a given $n_{s,f}^{\mu}$ and $l_0$ (as the pseudo-random sequence initialization, and hence c, is not the same). In a second initialization example, the pseudo-random sequence c may be initialized by an RRC parameter (which may be configured per SRS resource) that is different than $n_{ID}^{SRS}$. In this example, the pseudo-random sequence c may be de-coupled from $n_{ID}^{SRS}$ since the SRS sequence identity may be used to determine the SRS sequence. For example, if two UEs are not located near each other (e.g., do not create interference between each other) or if the SRS parameters associated with the UEs ensure orthogonalization (e.g., different comb offsets or different cyclic shifts of same base sequence), then randomization may not be needed and the network node 110 can assign the UEs the same RRC parameter. Otherwise, the network may assign the UEs different RRC parameters to achieve the randomization.

In some aspects, one or more candidate transmission occasion characteristics may be considered for the duration T. In a first example option (option 1), each candidate transmission occasion may correspond to one OFDM symbol, and the duration T may correspond to a duration of the SRS resource in a slot. In this case, L=N (e.g., the binary sequence length may be the same as the number of OFDM symbols in the SRS resource). In some aspects, each candidate transmission occasion may correspond to a group of consecutive OFDM symbols that have different comb offsets in the SRS resource, and the duration T may correspond to the duration of the SRS resource in the slot. In this case, SRS staggering may be applied (e.g., different SRS symbols have different comb offsets), and the number of consecutive OFDM symbols in the group (e.g., for one candidate transmission occasion) may be a function of the comb spacing and/or the number of symbols for the SRS resource. For example, the number of consecutive OFDM symbols in the group may be equal to the comb spacing. This may ensure that the group includes all of the comb offsets. Alternatively, the number of consecutive OFDM symbols in the group may be equal to the comb spacing divided (or multiplied) by a factor (e.g., an integer). This may ensure that the group includes a subset of equally distributed comb offsets. In some aspects, each candidate transmission occasion may correspond to a group of OFDM symbols to which a time domain orthogonal cover code (TD-OCC) has been applied in the SRS resource, and the duration T may correspond to the duration of the SRS resource in the slot. In this example, if the length of the TD-OCC sequence is X, each candidate transmission occasion may include X symbols in the SRS resource (e.g., L=N/X).

In a second example option (option 2), each candidate transmission occasion may correspond to one frequency hop, and the duration T may correspond to a duration of one frequency hop cycle (e.g., a duration in which all frequency hops are sounded). In this example, L may be equal to the number of frequency hops, and each candidate transmission occasion may have R symbols. In the case of aperiodic SRS (AP-SRS), the duration may be the duration of the SRS resource in the slot. In the case of periodic SRS (P-SRS) or semi-persistent SRS (SP-SRS), the duration may span multiple slots (e.g., across multiple periodicities of the SRS resource).

In a third example option (option 3), each candidate transmission occasion may correspond to an SRS resource in a slot, and the duration T may correspond to a duration of L consecutive periodicities of the SRS resource (e.g., L different slots in which the SRS resource is transmitted using the configured periodicity). In this case, L may be RRC configured to the UE 120. This option may be applicable for P-SRS and SP-SRS.

In a fourth example option (option 4), each candidate transmission occasion may correspond to one frequency hop cycle, and the duration T may correspond to a duration of L consecutive frequency hop cycles. In this case, L may be RRC configured to the UE 120. This option may be applicable for P-SRS and SP-SRS.

In a fifth example option (option 5), each candidate transmission occasion may correspond to one frequency hop, and the duration T may correspond to a duration of L consecutive frequency hop cycles, but may only include L transmission occasions for the same frequency hop. In this case, L may be RRC configured to the UE 120. This option may be applicable for P-SRS and SP-SRS. In some aspects, the binary sequence may be selected separately for each frequency hop. For example, if there are Y frequency hops, a physical duration of L frequency hop cycles may include Y virtual durations, and the binary sequence may be selected pseudo-randomly for each of the Y virtual durations.

In some aspects, as described above, the network node 110 and/or the UE 120 may determine the set of binary sequences. In a first example, the set of binary sequences may be fixed (e.g., in a specification) and may be based at least in part on the sequence length L. In a second example, the set of binary sequences may be RRC configured. For example, the network node 110 may determine the set of binary sequences, and may transmit an RRC message to the UE 120 that includes an indication of the set of binary sequences. In this example, the set of binary sequences may be configured per SRS resource, per SRS resource set, per CC, or per bandwidth part (BWP). In a third example, the set of binary sequences (or possible binary sequences) may be associated with a property, and the UE 120 may receive an indication of the property from the network node 110. In some aspects, the network node 110 may transmit an RRC message, and the UE 120 may receive the RRC message, that includes an indication of the possible binary sequences. In this case, the network node 110 may have some flexibility in configuring the set of binary sequences, and the binary sequences in the set of binary sequences may not be arbitrary (e.g., may be configured based at least in part on the property and/or another parameter). In some aspects, the network node 110 may configure the UE 120 with the property for the set of binary sequences, and the UE 120 may generate the set of binary sequences based at least in part on the property.

In some aspects, the property (or properties) for a binary sequence to be eligible to be included in the set of binary sequences may include one or more of the following properties. In a first example property, the binary sequence may need to have a fixed weight. For example, the fixed weight for the sequence may correspond to a number of "1s" (e.g., transmission occasions) in the sequence, where the weight can be fixed or can be RRC configured. In some aspects, the weight of "1" can be the criteria for the fixed set. In some aspects, for a weight w, there may be $\binom{L}{w}$ binary sequences (e.g., the configuration of the weight can determine the set). In a second example property, the weight of the sequence may need to be smaller a value. Alternatively, the weight of the sequence may need to be larger than the value. The value may be fixed or may be RRC configured. The value may determine the percentage of muting occasions or transmission occasions corresponding to the sequence. In a third example property, the number of consecutive "0s" or consecutive "1s" in the sequence may need to be smaller than a value. This may impose an additional restriction on run length so that the binary sequence does not result in a large number of consecutive muting occasions or a large number of consecutive transmission occasions. In a fourth example property, for every two sequences in the set, the number of "1s" in the same position of binary sequences (e.g., the number of collisions) may need to be smaller than a value. This may control the maximum number of collisions for two UEs that select two different binary sequences.

As described herein, the muting or transmission pattern may not be arbitrary and can be controlled by the choice of the set of binary sequences and the length L. In some aspects, the minimum and maximum number of transmissions in a given duration can be controlled. For example, if at least two transmissions are required in a duration of five candidate occasions, the set can include binary sequences of length five with two or more "1s" (e.g., {11000, 10100, 10010, 10001, 01100, . . . }). In some aspects, the maximum number of consecutive muting occasions or consecutive transmission occasions may be controlled indirectly through the choice of L and the choice of the set of binary sequences. For example, if L=4, and the set of binary sequences includes {1000,0100,0010,0001}, then the maximum number of consecutive muting occasions may be six (e.g., when 1000 is selected in one duration and 0001 is selected in the next duration), and the maximum number of consecutive transmission occasions may be two (e.g., when 0001 is selected in one duration and 1000 is selected in the next duration). In some aspects, the maximum number of collisions across different groups of UEs (that select different sequences) can be controlled. For example, with L=4 and the set of binary sequences being {1000,0100,0010,0001}, there may be no collision across different groups. As another example, with L=5 and the set of binary sequences being {11100,10011,01010,00101}, the maximum number of collisions across different groups (e.g., the maximum number of "1s" in the same place across any two pairs) may be one.

As shown by reference number 715, the UE 120 may transmit the SRS in accordance with the selected binary sequence. For example, the UE 120 may transmit the SRS at a time period corresponding to the second location in the binary sequence based at least in part on the UE 120 selecting the binary sequence {0100}. In another example, the UE 120 may transmit the SRS at a time period corresponding to the fourth location in the binary sequence based at least in part on the UE 120 selecting the binary sequence {0001}.

As described above, randomly muting the SRS transmissions may not be sufficient to ensure that there is not a large number of consecutive muting occasions or a large number of consecutive transmission occasions. This may negatively impact the performance of the network since the channel may not be available to the network node during consecutive muting occasions. Additionally, interference may persist for a duration that spans the number of consecutive transmission occasions. Using the techniques and apparatuses described herein, the UE 120 may select a binary sequence from a set of binary sequences based at least in part on a pseudo-random sequence. The binary sequences may be configured such that the UE 120 does not experience a large number of consecutive muting occasions or a large number of consecutive transmission occasions. This may improve the performance of the network due to greater availability of the channel and reduced interference.

As indicated above, FIG. 7 is provided as an example. Other examples may differ from what was described with regard to FIG. 7.

Figure 8:
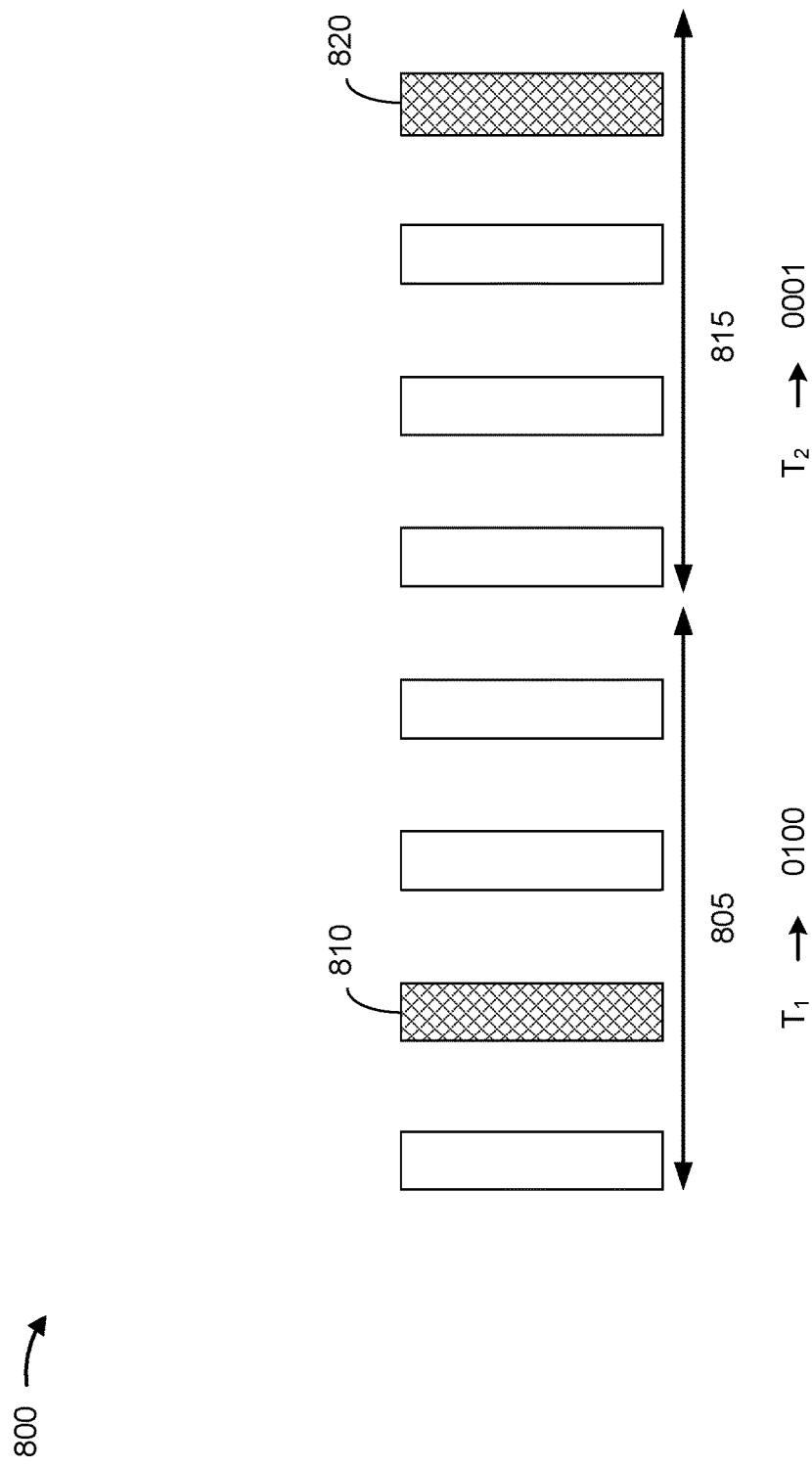
FIG. 8 is a diagram illustrating an example of a set of binary sequences, in accordance with the present disclosure.

FIG. 8 is a diagram illustrating an example 800 of a set of binary sequences, in accordance with the present disclosure. In some aspects, for a duration of time (T) that spans L candidate SRS transmission occasions, the UE 120 may select a binary sequence of length L from the set of binary sequences of length L in a pseudo-random manner, where a first value ("1") for a location in a binary sequence in the set of binary sequences indicates that an SRS is to be transmitted for the SRS transmission occasion corresponding to the location in the binary sequence and a second value ("0") for the location in the binary sequence indicates that the SRS is not to be transmitted for the SRS transmission occasion corresponding to the location in the binary sequence. An example set of binary sequences for L=4 may be {1000, 0100,0010,0001}.

In one example, the UE 120 may select a binary sequence 805 from the set of binary sequences to be used for a time $T_1$. The binary sequence 805 may correspond to the binary sequence 0100 from the set of binary sequences. In this case, the UE 120 may transmit an SRS at the time corresponding to the location 810 (e.g., the second location in the binary sequence 805) and may not transmit an SRS times corresponding to the other locations (e.g., the first location, third location, and fourth locations in the binary sequence 805).

In another example, the UE 120 may select a binary sequence 815 from the set of binary sequences to be used for a time $T_2$. The binary sequence 815 may correspond to the binary sequence 0001 from the set of binary sequences. In this case, the UE 120 may transmit an SRS at the time corresponding to the location 820 (e.g., the fourth location in the binary sequence 815) and may not transmit an SRS times corresponding to the other locations (e.g., the first location, second location, and third location in the binary sequence 815).

As indicated above, FIG. 8 is provided as an example. Other examples may differ from what was described with regard to FIG. 8.

Figure 9:
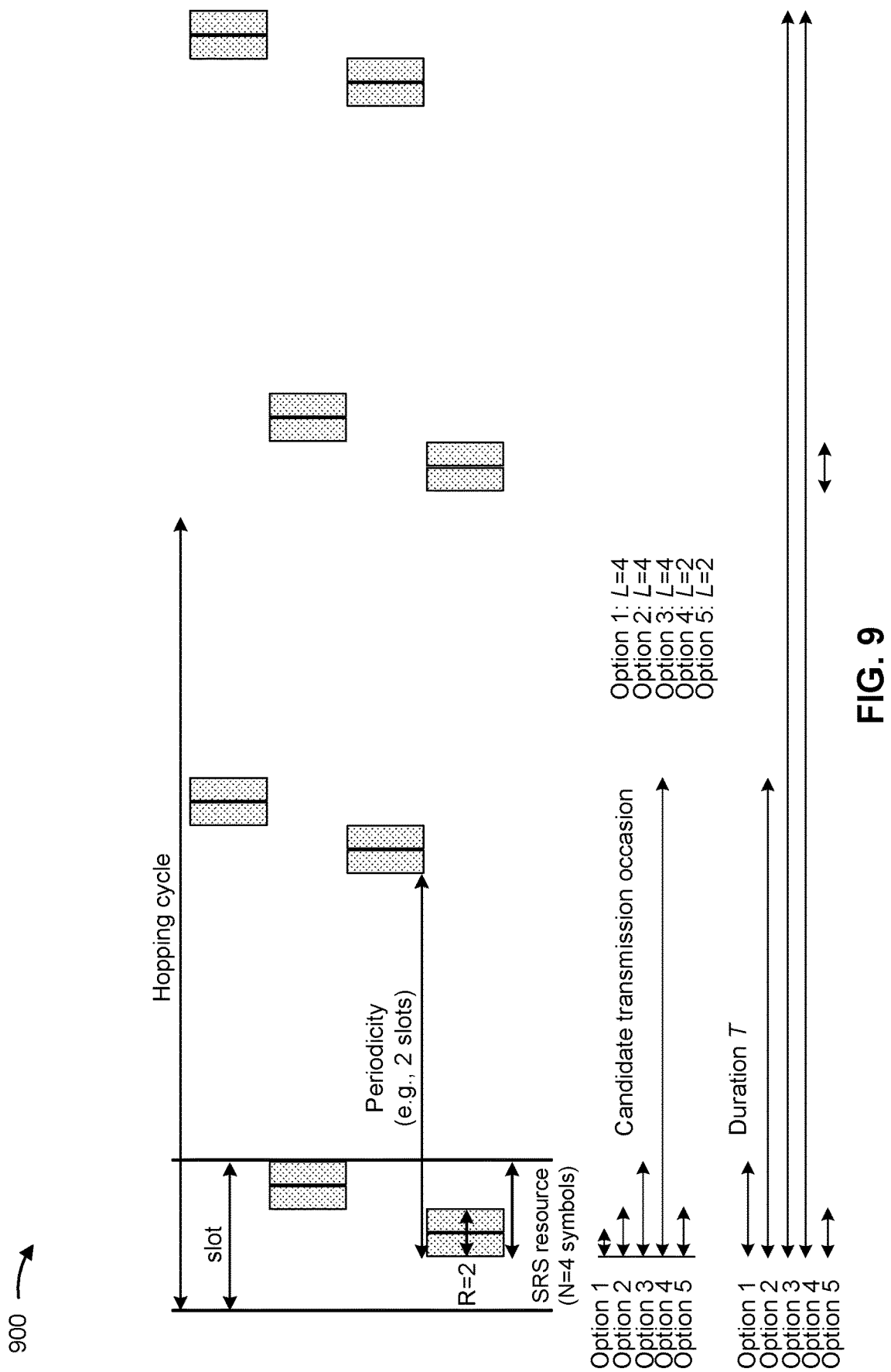
FIG. 9 is a diagram illustrating an example of candidate SRS transmission occasions and durations, in accordance with the present disclosure.

FIG. 9 is a diagram illustrating an example 900 of candidate transmission occasions and durations, in accordance with the present disclosure. As described above in connection with FIG. 7, one or more candidate transmission occasion characteristics may be considered for the duration T. Options 1-5 shown in FIG. 9 correspond to the example options 1-5, respectively, described above in connection with FIG. 7. In option 1, each candidate transmission occasion may correspond to one OFDM symbol, and the duration T may correspond to a duration of an SRS resource in a slot. In this case, L=N (e.g., the binary sequence length may be the same as the number of OFDM symbols in the SRS resource). In option 2, each candidate transmission occasion may correspond to one frequency hop, and the duration T may correspond to a duration of one frequency hop cycle (e.g., a duration in which all frequency hops are sounded). In this example, L may be equal to the number of frequency hops, and each candidate transmission occasion may have R symbols. In option 3, each candidate transmission occasion may correspond to an SRS resource in a slot, and the duration T may correspond to a duration of L consecutive periodicities of the SRS resource (e.g., L different slots in which the SRS resource is transmitted using the configured periodicity). In option 4, each candidate transmission occasion may correspond to one frequency hop cycle, and the duration T may correspond to a duration of L consecutive frequency hop cycles. In option 5, each candidate transmission occasion may correspond to one frequency hop, and the duration T may correspond to a duration of L consecutive frequency hop cycles, but may only include L transmission occasions for the same frequency hop.

As indicated above, FIG. 9 is provided as an example. Other examples may differ from what was described with regard to FIG. 9.

Figure 10:
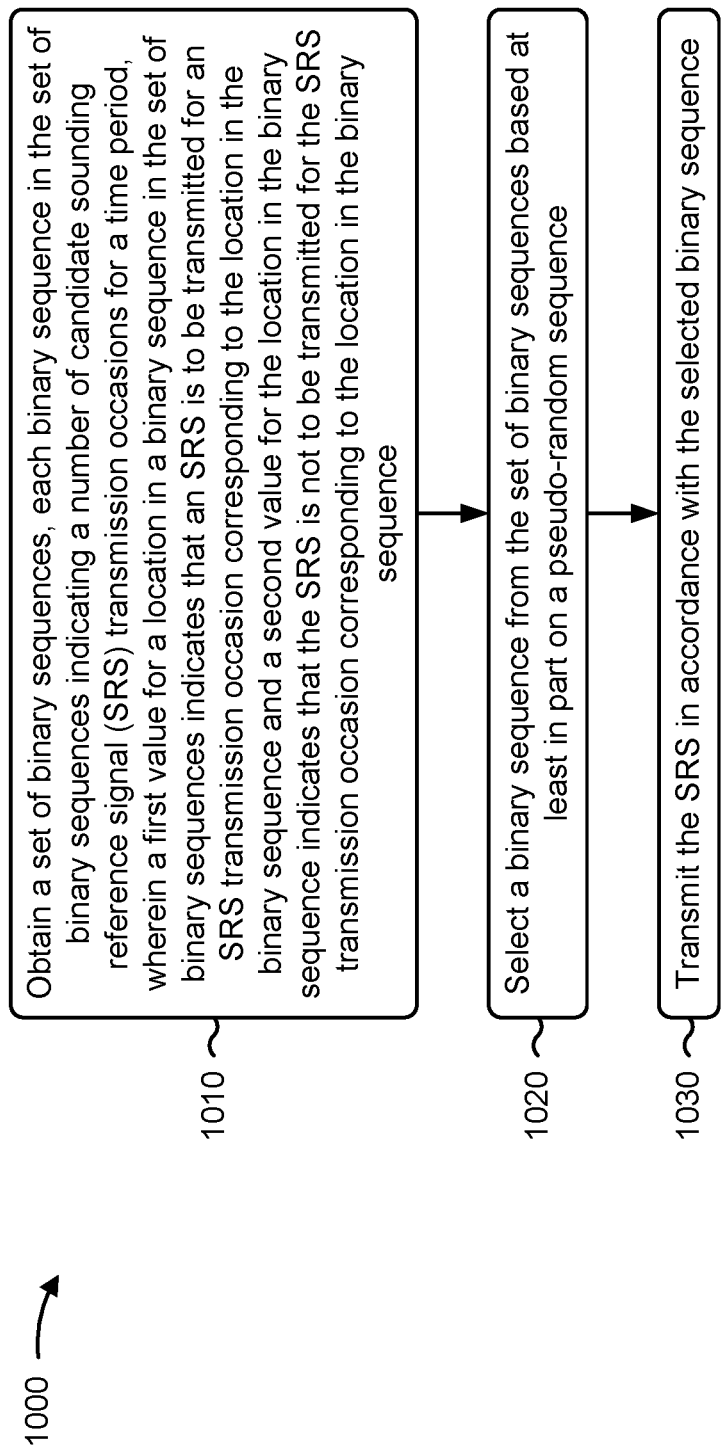
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with pseudo-random SRS transmission.

As shown in FIG. 10, in some aspects, process 1000 may include obtaining a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence (block 1010). For example, the UE (e.g., using communication manager 140 and/or obtaining component 1208, depicted in FIG. 12) may obtain a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence, as described above.

As further shown in FIG. 10, in some aspects, process 1000 may include selecting a binary sequence from the set of binary sequences based at least in part on a pseudo-random sequence (block 1020). For example, the UE (e.g., using communication manager 140 and/or selection component 1210, depicted in FIG. 12) may select a binary sequence from the set of binary sequences based at least in part on a pseudo-random sequence, as described above.

As further shown in FIG. 10, in some aspects, process 1000 may include transmitting the SRS in accordance with the selected binary sequence (block 1030). For example, the UE (e.g., using communication manager 140 and/or transmission component 1204, depicted in FIG. 12) may transmit the SRS in accordance with the selected binary sequence, as described above.

Process 1000 may include additional aspects, such as any single aspect or any combination of aspects described below and/or in connection with one or more other processes described elsewhere herein.

In a first aspect, selecting the binary sequence based at least in part on the pseudo-random sequence further comprises selecting the binary sequence based at least in part on a slot number or a symbol number associated with the time period.

In a second aspect, alone or in combination with the first aspect, selecting the binary sequence based at least in part on the slot number or the symbol number associated with the time period comprises selecting the binary sequence based at least in part on a slot number corresponding to a first slot within the time period and based at least in part on a symbol number corresponding to a first symbol within the time period.

In a third aspect, alone or in combination with one or more of the first and second aspects, selecting the binary sequence based at least in part on the slot number or the symbol number associated with the time period comprises selecting the binary sequence based at least in part on a slot number corresponding to a first slot within the time period.

In a fourth aspect, alone or in combination with one or more of the first through third aspects, the pseudo-random sequence is based at least in part on an SRS sequence identity that is configured for an SRS resource or based at least in part on a radio resource control parameter that is configured for the SRS resource.

In a fifth aspect, alone or in combination with one or more of the first through fourth aspects, each candidate SRS transmission occasion of the number of SRS transmission occasions corresponds to a single OFDM symbol, and the time period corresponds to a duration of an SRS resource within a slot.

In a sixth aspect, alone or in combination with one or more of the first through fifth aspects, each candidate SRS transmission occasion of the number of SRS transmission occasions corresponds to a group of consecutive OFDM symbols that have different comb offsets within an SRS resource, and the time period corresponds to a duration of the SRS resource within a slot.

In a seventh aspect, alone or in combination with one or more of the first through sixth aspects, the number of consecutive OFDM symbols is based at least in part on a comb spacing value and a number of symbols within an SRS resource.

In an eighth aspect, alone or in combination with one or more of the first through seventh aspects, the number of consecutive OFDM symbols is equal to the comb spacing value or is equal to the comb spacing value divided by an integer.

In a ninth aspect, alone or in combination with one or more of the first through eighth aspects, each candidate SRS transmission occasion of the number of SRS transmission occasions corresponds to a group of consecutive OFDM symbols that have been multiplied by a TD-OCC sequence within an SRS resource, and the time period corresponds to a duration of the SRS resource within a slot.

In a tenth aspect, alone or in combination with one or more of the first through ninth aspects, each candidate SRS transmission occasion includes a number of symbols that is equal to a length of the TD-OCC sequence.

In an eleventh aspect, alone or in combination with one or more of the first through tenth aspects, each candidate SRS transmission occasion of the number of SRS transmission occasions corresponds to a frequency hop, and the time period corresponds to a duration of a frequency hop cycle.

In a twelfth aspect, alone or in combination with one or more of the first through eleventh aspects, the duration of the frequency hop cycle is a duration of an SRS resource in a slot based at least in part on the SRS being an aperiodic SRS, or is a duration that spans multiple slots across multiple periodicities of the SRS resource based at least in part on the SRS being a periodic SRS or a semi-persistent SRS.

In a thirteenth aspect, alone or in combination with one or more of the first through twelfth aspects, each candidate SRS transmission occasion of the number of candidate SRS transmission occasions corresponds to an SRS resource in a slot, and the time period corresponds to a duration of multiple consecutive periodicities of the SRS resource in multiple different slots.

In a fourteenth aspect, alone or in combination with one or more of the first through thirteenth aspects, each candidate SRS transmission occasion of the number of candidate SRS transmission occasions corresponds to a single frequency hop cycle, and the time period corresponds to multiple consecutive frequency hop cycles.

In a fifteenth aspect, alone or in combination with one or more of the first through fourteenth aspects, each candidate SRS transmission occasion of the number of candidate SRS transmission occasions corresponds to a single frequency hop, and the time period corresponds to multiple consecutive frequency hop cycles and includes a number of transmission occasions for each frequency hop in the multiple consecutive frequency hop cycles.

In a sixteenth aspect, alone or in combination with one or more of the first through fifteenth aspects, the set of binary sequences is determined based at least in part on a configuration and based at least in part on a sequence length that corresponds to the number of candidate SRS transmission occasions for the time period.

In a seventeenth aspect, alone or in combination with one or more of the first through sixteenth aspects, process 1000 includes receiving a RRC message that includes the set of binary sequences.

In an eighteenth aspect, alone or in combination with one or more of the first through seventeenth aspects, the RRC message is configured per SRS resource, per SRS resource set, per component carrier, or per bandwidth part.

In a nineteenth aspect, alone or in combination with one or more of the first through eighteenth aspects, process 1000 includes receiving a RRC message that includes information associated with the set of binary sequences.

In a twentieth aspect, alone or in combination with one or more of the first through nineteenth aspects, process 1000 includes determining the set of binary sequences based at least in part on the information included in the RRC message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
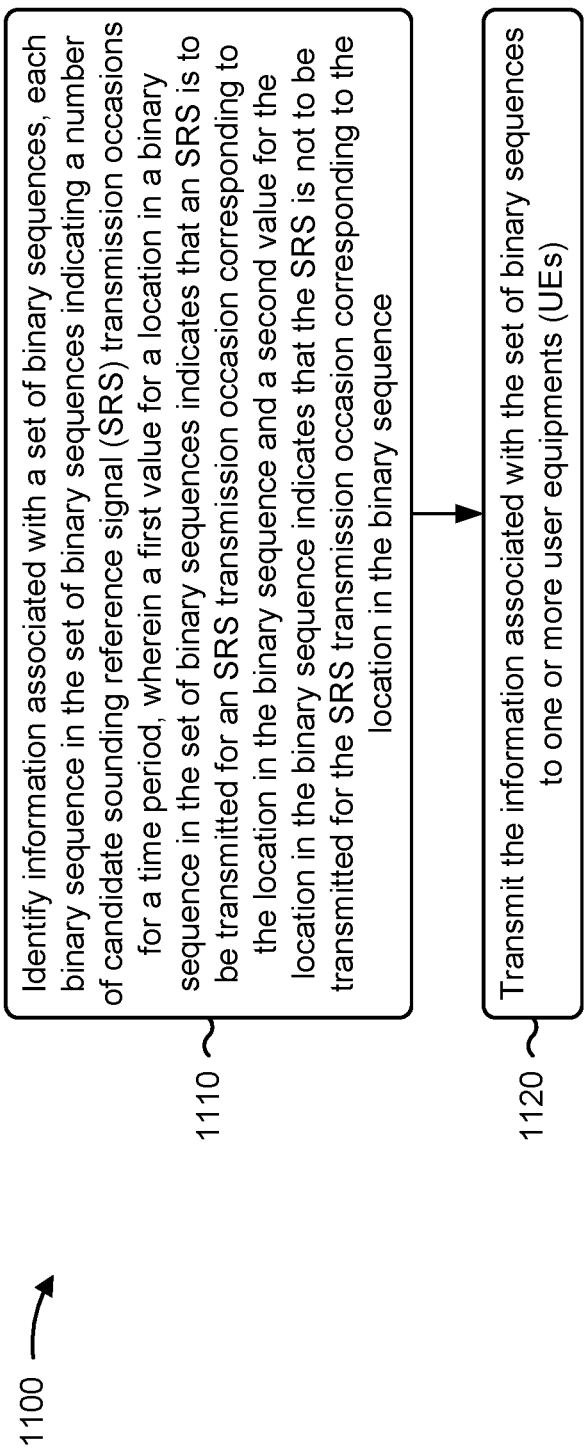
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110) performs operations associated with pseudo-random SRS transmission.

As shown in FIG. 11, in some aspects, process 1100 may include identifying information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence (block 1110). For example, the network node (e.g., using communication manager 150 and/or identification component 1308, depicted in FIG. 13) may identify information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence, as described above.

As further shown in FIG. 11, in some aspects, process 1100 may include transmitting the information associated with the set of binary sequences to one or more UEs (block 1120). For example, the network node (e.g., using communication manager 150 and/or transmission component 1304, depicted in FIG. 13) may transmit the information associated with the set of binary sequences to one or more UEs, as described above.

Process 1100 may include additional aspects, such as any single aspect or any combination of aspects described below and/or in connection with one or more other processes described elsewhere herein.

In a first aspect, identifying the information associated with the set of binary sequences comprises initializing a pseudo-random sequence for selecting a binary sequence from the set of binary sequences.

In a second aspect, alone or in combination with the first aspect, initializing the pseudo-random sequence comprises initializing the pseudo-random sequence based at least in part on an SRS sequence identity.

In a third aspect, alone or in combination with one or more of the first and second aspects, initializing the pseudo-random sequence comprises initializing the pseudo-random sequence based at least in part on a radio resource control parameter that is configured per SRS resource.

In a fourth aspect, alone or in combination with one or more of the first through third aspects, identifying the information comprises identifying the information associated with the set of binary sequences based at least in part on a sequence length that corresponds to the number of candidate SRS transmission occasions for the time period.

In a fifth aspect, alone or in combination with one or more of the first through fourth aspects, transmitting the information comprises transmitting a RRC message that includes the set of binary sequences.

In a sixth aspect, alone or in combination with one or more of the first through fifth aspects, the RRC message is configured per SRS resource, per SRS resource set, per component carrier, or per bandwidth part.

In a seventh aspect, alone or in combination with one or more of the first through sixth aspects, transmitting the information comprises transmitting information that identifies one or more properties for the set of binary sequences.

In an eighth aspect, alone or in combination with one or more of the first through seventh aspects, the one or more properties include a weight for one or more sequences in the set of binary sequences, a weight for the set of binary sequences, a number of consecutive first values in the set of binary sequences, or a number of consecutive second values in the set of binary sequences.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
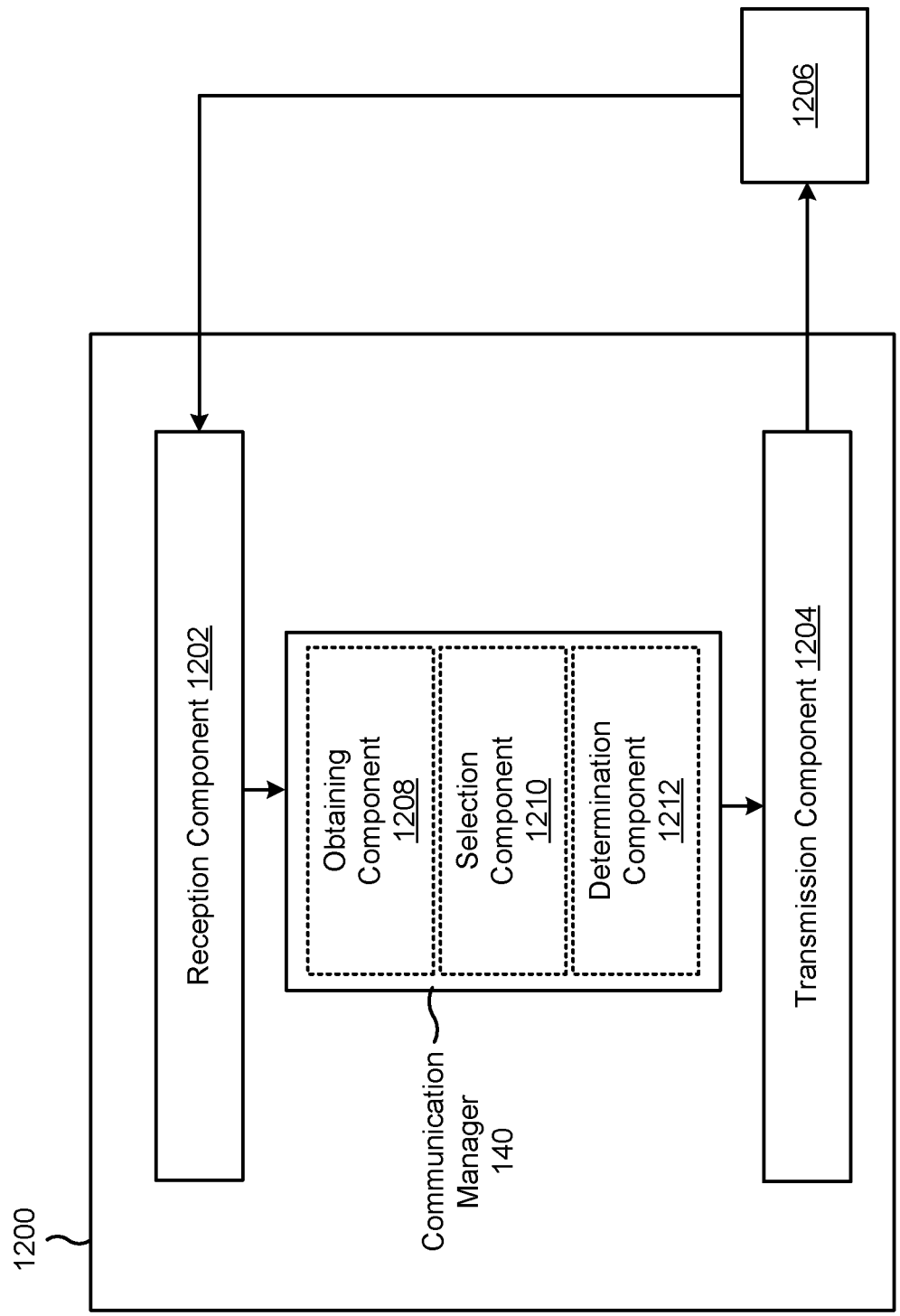
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of an obtaining component 1208, a selection component 1210, or a determination component 1212, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The obtaining component 1208 may obtain a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The selection component 1210 may select a binary sequence from the set of binary sequences based at least in part on a pseudo-random sequence. The transmission component 1204 may transmit the SRS in accordance with the selected binary sequence.

The reception component 1202 may receive a RRC message that includes the set of binary sequences. The reception component 1202 may receive a RRC message that includes information associated with the set of binary sequences. The determination component 1212 may determine the set of binary sequences based at least in part on the information included in the RRC message.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
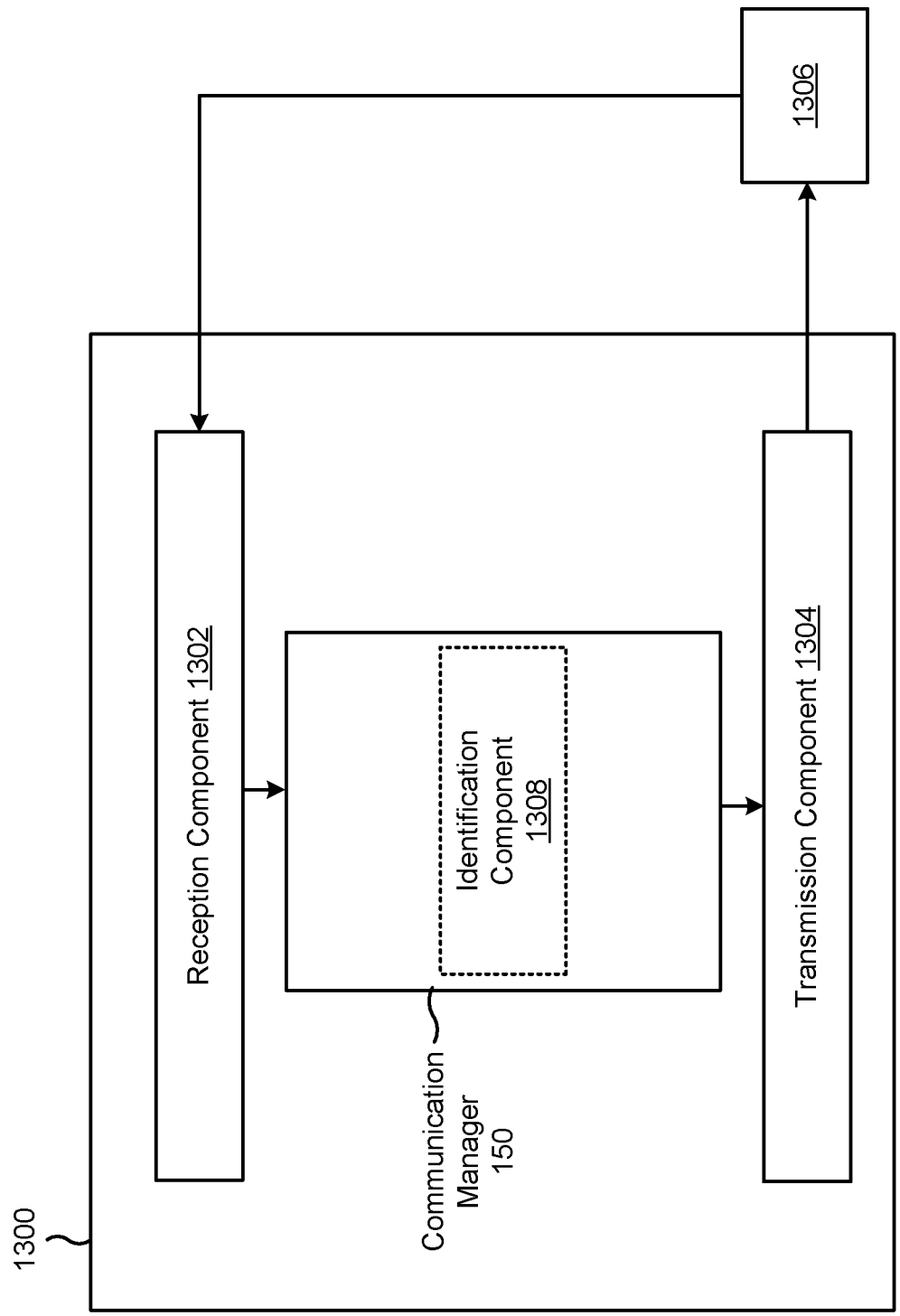
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include an identification component 1308, among other examples.

In some aspects, the apparatus 1300 may be configured to perform one or more operations described herein in connection with FIGS. 7-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The identification component 1308 may identify information associated with a set of binary sequences, each binary sequence in the set of binary sequences indicating a number of candidate SRS transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence. The transmission component 1304 may transmit the information associated with the set of binary sequences to one or more UEs.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: obtaining a set of binary sequences, each binary sequence in the set of binary sequences indicating a number of candidate sounding reference signal (SRS) transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence; selecting a binary sequence from the set of binary sequences based at least in part on a pseudo-random sequence; and transmitting the SRS in accordance with the selected binary sequence.

Aspect 2: The method of Aspect 1, wherein selecting the binary sequence based at least in part on the pseudo-random sequence further comprises selecting the binary sequence based at least in part on a slot number or a symbol number associated with the time period.

Aspect 3: The method of Aspect 2, wherein selecting the binary sequence based at least in part on the slot number or the symbol number associated with the time period comprises selecting the binary sequence based at least in part on a slot number corresponding to a first slot within the time period and based at least in part on a symbol number corresponding to a first symbol within the time period.

Aspect 4: The method of Aspect 2, wherein selecting the binary sequence based at least in part on the slot number or the symbol number associated with the time period comprises selecting the binary sequence based at least in part on a slot number corresponding to a first slot within the time period.

Aspect 5: The method of any of Aspects 1-4, wherein the pseudo-random sequence is based at least in part on an SRS sequence identity that is configured for an SRS resource or based at least in part on a radio resource control parameter that is configured for the SRS resource.

Aspect 6: The method of any of Aspects 1-5, wherein each candidate SRS transmission occasion of the number of SRS transmission occasions corresponds to a single orthogonal frequency division multiplexing (OFDM) symbol, and the time period corresponds to a duration of an SRS resource within a slot.

Aspect 7: The method of any of Aspects 1-6, wherein each candidate SRS transmission occasion of the number of SRS transmission occasions corresponds to a group of consecutive orthogonal frequency division multiplexing (OFDM) symbols that have different comb offsets within an SRS resource, and the time period corresponds to a duration of the SRS resource within a slot.

Aspect 8: The method of Aspect 7, wherein the number of consecutive OFDM symbols is based at least in part on a comb spacing value and a number of symbols within an SRS resource.

Aspect 9: The method of Aspect 8, wherein the number of consecutive OFDM symbols is equal to the comb spacing value or is equal to the comb spacing value divided by an integer.

Aspect 10: The method of any of Aspects 1-9, wherein each candidate SRS transmission occasion of the number of SRS transmission occasions corresponds to a group of consecutive orthogonal frequency division multiplexing (OFDM) symbols that have been multiplied by a time domain orthogonal cover code (TD-OCC) sequence within an SRS resource, and the time period corresponds to a duration of the SRS resource within a slot.

Aspect 11: The method of Aspect 10, wherein each candidate SRS transmission occasion includes a number of symbols that is equal to a length of the TD-OCC sequence.

Aspect 12: The method of any of Aspects 1-11, wherein each candidate SRS transmission occasion of the number of SRS transmission occasions corresponds to a frequency hop, and the time period corresponds to a duration of a frequency hop cycle.

Aspect 13: The method of Aspect 12, wherein the duration of the frequency hop cycle is a duration of an SRS resource in a slot based at least in part on the SRS being an aperiodic SRS, or is a duration that spans multiple slots across multiple periodicities of the SRS resource based at least in part on the SRS being a periodic SRS or a semi-persistent SRS.

Aspect 14: The method of any of Aspects 1-13, wherein each candidate SRS transmission occasion of the number of candidate SRS transmission occasions corresponds to an SRS resource in a slot, and the time period corresponds to a duration of multiple consecutive periodicities of the SRS resource in multiple different slots.

Aspect 15: The method of any of Aspects 1-14, wherein each candidate SRS transmission occasion of the number of candidate SRS transmission occasions corresponds to a single frequency hop cycle, and the time period corresponds to multiple consecutive frequency hop cycles.

Aspect 16: The method of any of Aspects 1-15, wherein each candidate SRS transmission occasion of the number of candidate SRS transmission occasions corresponds to a single frequency hop, and the time period corresponds to multiple consecutive frequency hop cycles and includes a number of transmission occasions for each frequency hop in the multiple consecutive frequency hop cycles.

Aspect 17: The method of any of Aspects 1-16, wherein the set of binary sequences is determined based at least in part on a configuration and based at least in part on a sequence length that corresponds to the number of candidate SRS transmission occasions for the time period.

Aspect 18: The method of any of Aspects 1-17, further comprising receiving a radio resource control (RRC) message that includes the set of binary sequences.

Aspect 19: The method of Aspect 18, wherein the RRC message is configured per SRS resource, per SRS resource set, per component carrier, or per bandwidth part.

Aspect 20: The method of any of Aspects 1-19, further comprising receiving a radio resource control (RRC) message that includes information associated with the set of binary sequences.

Aspect 21: The method of Aspect 20, further comprising determining the set of binary sequences based at least in part on the information included in the RRC message.

Aspect 22: A method of wireless communication performed by a network node, comprising: identifying information associated with a set of binary sequences, each binary sequence in the set of binary sequences indicating a number of candidate sounding reference signal (SRS) transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence; and transmitting the information associated with the set of binary sequences to one or more user equipments (UEs).

Aspect 23: The method of Aspect 22, wherein identifying the information associated with the set of binary sequences comprises initializing a pseudo-random sequence for selecting a binary sequence from the set of binary sequences.

Aspect 24: The method of Aspect 23, wherein initializing the pseudo-random sequence comprises initializing the pseudo-random sequence based at least in part on an SRS sequence identity.

Aspect 25: The method of Aspect 23, wherein initializing the pseudo-random sequence comprises initializing the pseudo-random sequence based at least in part on a radio resource control parameter that is configured per SRS resource.

Aspect 26: The method of any of Aspects 22-25, wherein identifying the information comprises identifying the information associated with the set of binary sequences based at least in part on a sequence length that corresponds to the number of candidate SRS transmission occasions for the time period.

Aspect 27: The method of any of Aspects 22-26, wherein transmitting the information comprises transmitting a radio resource control (RRC) message that includes the set of binary sequences.

Aspect 28: The method of Aspect 27, wherein the RRC message is configured per SRS resource, per SRS resource set, per component carrier, or per bandwidth part.

Aspect 29: The method of any of Aspects 22-28, wherein transmitting the information comprises transmitting information that identifies one or more properties for the set of binary sequences.

Aspect 30: The method of Aspect 29, wherein the one or more properties include a weight for one or more sequences in the set of binary sequences, a weight for the set of binary sequences, a number of consecutive first values in the set of binary sequences, or a number of consecutive second values in the set of binary sequences.

Aspect 31: An apparatus for wireless communication at a device, comprising a processor; memory coupled with the processor; and instructions stored in the memory and executable by the processor to cause the apparatus to perform the method of one or more of Aspects 1-21.

Aspect 32: A device for wireless communication, comprising a memory and one or more processors coupled to the memory, the one or more processors configured to perform the method of one or more of Aspects 1-21.

Aspect 33: An apparatus for wireless communication, comprising at least one means for performing the method of one or more of Aspects 1-21.

Aspect 34: A non-transitory computer-readable medium storing code for wireless communication, the code comprising instructions executable by a processor to perform the method of one or more of Aspects 1-21.

Aspect 35: A non-transitory computer-readable medium storing a set of instructions for wireless communication, the set of instructions comprising one or more instructions that, when executed by one or more processors of a device, cause the device to perform the method of one or more of Aspects 1-21.

Aspect 36: An apparatus for wireless communication at a device, comprising a processor; memory coupled with the processor; and instructions stored in the memory and executable by the processor to cause the apparatus to perform the method of one or more of Aspects 22-30.

Aspect 37: A device for wireless communication, comprising a memory and one or more processors coupled to the memory, the one or more processors configured to perform the method of one or more of Aspects 22-30.

Aspect 38: An apparatus for wireless communication, comprising at least one means for performing the method of one or more of Aspects 22-30.

Aspect 39: A non-transitory computer-readable medium storing code for wireless communication, the code comprising instructions executable by a processor to perform the method of one or more of Aspects 22-30.

Aspect 40: A non-transitory computer-readable medium storing a set of instructions for wireless communication, the set of instructions comprising one or more instructions that, when executed by one or more processors of a device, cause the device to perform the method of one or more of Aspects 22-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      obtain a set of binary sequences, each binary sequence in the set of binary sequences indicating a number of candidate sounding reference signal (SRS) transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence;
      select a binary sequence from the set of binary sequences based at least in part on a pseudo-random sequence; and
      transmit the SRS in accordance with the selected binary sequence.

2. The apparatus of claim 1, wherein the one or more processors, to select the binary sequence based at least in part on the pseudo-random sequence, are configured to select the binary sequence based at least in part on a slot number or a symbol number associated with the time period.

3. The apparatus of claim 2, wherein the one or more processors, to select the binary sequence based at least in part on the slot number or the symbol number associated with the time period, are configured to select the binary sequence based at least in part on a slot number corresponding to a first slot within the time period and based at least in part on a symbol number corresponding to a first symbol within the time period.

4. The apparatus of claim 2, wherein the one or more processors, to select the binary sequence based at least in part on the slot number or the symbol number associated with the time period, are configured to select the binary sequence based at least in part on a slot number corresponding to a first slot within the time period.

5. The apparatus of claim 1, wherein each candidate SRS transmission occasion of the number of SRS transmission occasions corresponds to a single orthogonal frequency division multiplexing (OFDM) symbol, and the time period corresponds to a duration of an SRS resource within a slot.

6. The apparatus of claim 1, wherein each candidate SRS transmission occasion of the number of SRS transmission occasions corresponds to a group of consecutive orthogonal frequency division multiplexing (OFDM) symbols that have different comb offsets within an SRS resource, and the time period corresponds to a duration of the SRS resource within a slot.

7. The apparatus of claim 6, wherein the number of consecutive OFDM symbols is based at least in part on a comb spacing value and a number of symbols within an SRS resource.

8. The apparatus of claim 1, wherein each candidate SRS transmission occasion of the number of SRS transmission occasions corresponds to a group of consecutive orthogonal frequency division multiplexing (OFDM) symbols that have been multiplied by a time domain orthogonal cover code (TD-OCC) sequence within an SRS resource, and the time period corresponds to a duration of the SRS resource within a slot.

9. The apparatus of claim 8, wherein each candidate SRS transmission occasion includes a number of symbols that is equal to a length of the TD-OCC sequence.

10. The apparatus of claim 1, wherein each candidate SRS transmission occasion of the number of SRS transmission occasions corresponds to a frequency hop, and the time period corresponds to a duration of a frequency hop cycle.

11. The apparatus of claim 10, wherein the duration of the frequency hop cycle is a duration of an SRS resource in a slot based at least in part on the SRS being an aperiodic SRS, or is a duration that spans multiple slots across multiple periodicities of the SRS resource based at least in part on the SRS being a periodic SRS or a semi-persistent SRS.

12. The apparatus of claim 1, wherein each candidate SRS transmission occasion of the number of candidate SRS transmission occasions corresponds to an SRS resource in a slot, and the time period corresponds to a duration of multiple consecutive periodicities of the SRS resource in multiple different slots.

13. The apparatus of claim 1, wherein each candidate SRS transmission occasion of the number of candidate SRS transmission occasions corresponds to a single frequency hop cycle, and the time period corresponds to multiple consecutive frequency hop cycles.

14. The apparatus of claim 1, wherein each candidate SRS transmission occasion of the number of candidate SRS transmission occasions corresponds to a single frequency hop, and the time period corresponds to multiple consecutive frequency hop cycles and includes a number of transmission occasions for each frequency hop in the multiple consecutive frequency hop cycles.

15. The apparatus of claim 1, wherein the set of binary sequences is determined based at least in part on a configuration and based at least in part on a sequence length that corresponds to the number of candidate SRS transmission occasions for the time period.

16. The apparatus of claim 1, wherein the one or more processors are further configured to receive a radio resource control (RRC) message that includes the set of binary sequences.

17. The apparatus of claim 1, wherein the one or more processors are further configured to receive a radio resource control (RRC) message that includes information associated with the set of binary sequences.

18. The apparatus of claim 17, wherein the one or more processors are further configured to determine the set of binary sequences based at least in part on the information included in the RRC message.

19. An apparatus for wireless communication at a network node, comprising:
   a memory; and
   one or more processors, coupled to the memory, configured to:
      identify information associated with a set of binary sequences, each binary sequence in the set of binary sequences indicating a number of candidate sounding reference signal (SRS) transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence; and transmit the information associated with the set of binary sequences to one or more user equipments (UEs).

20. The apparatus of claim 19, wherein the one or more processors, to identify the information associated with the set of binary sequences, are configured to initialize a pseudo-random sequence for selecting a binary sequence from the set of binary sequences.

21. The apparatus of claim 20, wherein the one or more processors, to initialize the pseudo-random sequence, are configured to initialize the pseudo-random sequence based at least in part on an SRS sequence identity.

22. The apparatus of claim 20, wherein the one or more processors, to initialize the pseudo-random sequence, are configured to initialize the pseudo-random sequence based at least in part on a radio resource control parameter that is configured per SRS resource.

23. The apparatus of claim 19, wherein the one or more processors, to identify the information, are configured to identify the information associated with the set of binary sequences based at least in part on a sequence length that corresponds to the number of candidate SRS transmission occasions for the time period.

24. The apparatus of claim 19, wherein the one or more processors, to transmit the information, are configured to transmit a radio resource control (RRC) message that includes the set of binary sequences.

25. The apparatus of claim 19, wherein the one or more processors, to transmit the information, are configured to transmit information that identifies one or more properties for the set of binary sequences.

26. The apparatus of claim 25, wherein the one or more properties include a weight for one or more sequences in the set of binary sequences, a weight for the set of binary sequences, a number of consecutive first values in the set of binary sequences, or a number of consecutive second values in the set of binary sequences.

27. A method of wireless communication performed by a user equipment (UE), comprising:

obtaining a set of binary sequences, each binary sequence in the set of binary sequences indicating a number of candidate sounding reference signal (SRS) transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence;

selecting a binary sequence from the set of binary sequences based at least in part on a pseudo-random sequence; and transmitting the SRS in accordance with the selected binary sequence.

28. The method of claim 27, wherein selecting the binary sequence based at least in part on the pseudo-random sequence further comprises selecting the binary sequence based at least in part on a slot number or a symbol number associated with the time period.

29. A method of wireless communication performed by a network node, comprising:

identifying information associated with a set of binary sequences, each binary sequence in the set of binary sequences indicating a number of candidate sounding reference signal (SRS) transmission occasions for a time period, wherein a first value for a location in a binary sequence in the set of binary sequences indicates that an SRS is to be transmitted for an SRS transmission occasion corresponding to the location in the binary sequence and a second value for the location in the binary sequence indicates that the SRS is not to be transmitted for the SRS transmission occasion corresponding to the location in the binary sequence; and transmitting the information associated with the set of binary sequences to one or more user equipments (UEs).

30. The method of claim 29, wherein identifying the information associated with the set of binary sequences comprises initializing a pseudo-random sequence for selecting a binary sequence from the set of binary sequences.

* * * * *